United States Patent
Robinson et al.

(10) Patent No.: US 7,753,268 B1
(45) Date of Patent: Jul. 13, 2010

(54) SYSTEM AND METHOD FOR NEGOTIABLE INSTRUMENT CASHING TRANSACTION ASSISTANCE PROCEDURES

(75) Inventors: Timothy L. Robinson, Reston, VA (US); Bradford R. Schildt, Boulder, CO (US); Tennille V. Goff, Springfield, VA (US); Daniel J. Corwin, Fredericksburg, VA (US); Timothy Neil Watson, Alexandria, VA (US)

(73) Assignee: Phoenix Check Cashing, Inc., Herndon, VA (US)

( * ) Notice: Subject to any disclaimer, the term of this patent is extended or adjusted under 35 U.S.C. 154(b) by 132 days.

(21) Appl. No.: 11/217,303

(22) Filed: Sep. 2, 2005

Related U.S. Application Data

(63) Continuation-in-part of application No. 10/142,687, filed on May 10, 2002, now Pat. No. 6,957,770.

(51) Int. Cl.
*G06K 15/00* (2006.01)
(52) U.S. Cl. .................. 235/383; 235/379; 235/380
(58) Field of Classification Search ................ 235/383, 235/379, 380, 382; 705/43, 44, 45
See application file for complete search history.

(56) References Cited

U.S. PATENT DOCUMENTS

| | | | |
|---|---|---|---|
| 4,109,238 A | 8/1978 | Creekmore | |
| 4,187,498 A | 2/1980 | Creekmore | |
| 4,580,040 A | 4/1986 | Granzow et al. | |
| 4,617,457 A | 10/1986 | Granzow et al. | |
| 4,672,377 A | 6/1987 | Murphy et al. | |
| 4,975,969 A | 12/1990 | Tal | |
| 4,993,068 A | 2/1991 | Piosenka et al. | |
| 4,995,086 A | 2/1991 | Lilley et al. | |
| 5,053,607 A | 10/1991 | Carlson et al. | |
| 5,095,194 A | 3/1992 | Barbanell | |
| 5,144,680 A | 9/1992 | Kobayashi et al. | |
| 5,327,508 A | 7/1994 | Deaton et al. | |
| 5,341,428 A | 8/1994 | Schatz | |
| 5,386,103 A | 1/1995 | DeBan et al. | |
| 5,448,471 A | 9/1995 | Deaton et al. | |
| 5,469,506 A | 11/1995 | Berson et al. | |
| 5,513,272 A | 4/1996 | Bogosian, Jr. | |
| 5,581,630 A | 12/1996 | Bonneau, Jr. | |
| 5,592,377 A | 1/1997 | Lipkin | |

(Continued)

FOREIGN PATENT DOCUMENTS

EP 0991006 A2 4/2000

(Continued)

OTHER PUBLICATIONS

S. Davies. Touching Big Brother. How Biometric Technology Will Fuse Flesh and Machine. Information Technology & People. vol. 7 (4) 1994.

(Continued)

*Primary Examiner*—Ahshik Kim
(74) *Attorney, Agent, or Firm*—Finnegan, Henderson, Farabow, Garrett & Dunner, LLP

(57) ABSTRACT

A system and method of assistance procedures that involve a negotiable instrument casher in the negotiable instrument validity determination process. The present invention involves the casher in the determining process by providing a walkthrough and network assistance procedures.

20 Claims, 5 Drawing Sheets

U.S. PATENT DOCUMENTS

| | | | |
|---|---|---|---|
| 5,592,560 A | 1/1997 | Deaton et al. | |
| 5,613,012 A | 3/1997 | Hoffman et al. | |
| 5,620,061 A | 4/1997 | Fraser | |
| 5,621,812 A | 4/1997 | Deaton et al. | |
| 5,638,457 A | 6/1997 | Deaton et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,659,469 A | 8/1997 | Deaton et al. | |
| 5,679,938 A | 10/1997 | Templeton et al. | |
| 5,687,322 A | 11/1997 | Deaton et al. | |
| 5,802,199 A | 9/1998 | Pare, Jr. et al. | |
| 5,838,812 A | 11/1998 | Pare et al. | |
| 5,897,625 A | 4/1999 | Gustin et al. | |
| 5,903,881 A * | 5/1999 | Schrader et al. | 705/42 |
| 5,910,988 A | 6/1999 | Ballard | |
| 6,009,411 A | 12/1999 | Kepecs | |
| 6,012,039 A | 1/2000 | Hoffman et al. | |
| 6,023,688 A | 2/2000 | Ramachandran et al. | |
| 6,032,137 A | 2/2000 | Ballard | |
| 6,036,344 A | 3/2000 | Goldenberg | |
| 6,038,553 A * | 3/2000 | Hyde, Jr. | 705/45 |
| 6,045,039 A | 4/2000 | Stinson et al. | |
| 6,067,524 A | 5/2000 | Byerly et al. | |
| 6,129,273 A | 10/2000 | Shah | |
| 6,145,738 A | 11/2000 | Stinson et al. | |
| 6,149,056 A | 11/2000 | Stinson et al. | |
| 6,164,528 A | 12/2000 | Hills et al. | |
| 6,202,055 B1 | 3/2001 | Houvener et al. | |
| 6,222,914 B1 | 4/2001 | McMullin | |
| 6,230,148 B1 | 5/2001 | Pare, Jr. et al. | |
| 6,240,394 B1 | 5/2001 | Uecker et al. | |
| 6,282,523 B1 | 8/2001 | Tedesco et al. | |
| 6,283,366 B1 | 9/2001 | Hills et al. | |
| 6,286,756 B1 | 9/2001 | Stinson et al. | |
| 6,292,786 B1 | 9/2001 | Deaton et al. | |
| 6,307,958 B1 | 10/2001 | Deaton et al. | |
| 6,310,966 B1 | 10/2001 | Dulude et al. | |
| 6,327,573 B1 | 12/2001 | Walker et al. | |
| 6,328,207 B1 | 12/2001 | Gregoire et al. | |
| 6,330,543 B1 | 12/2001 | Kepecs | |
| 6,334,108 B1 | 12/2001 | Deaton et al. | |
| 6,334,109 B1 | 12/2001 | Kanevsky et al. | |
| 6,345,491 B1 | 2/2002 | Nichols et al. | |
| 6,351,735 B1 | 2/2002 | Deaton et al. | |
| 6,377,935 B1 | 4/2002 | Deaton et al. | |
| 6,389,401 B1 | 5/2002 | Kepecs | |
| 6,415,262 B1 | 7/2002 | Walker et al. | |
| 6,424,949 B1 | 7/2002 | Deaton et al. | |
| 6,456,981 B1 | 9/2002 | Dejaeger et al. | |
| 6,464,134 B1 | 10/2002 | Page | |
| 6,505,170 B1 * | 1/2003 | Seifert et al. | 705/21 |
| 6,507,279 B2 | 1/2003 | Loof | |
| 6,516,302 B1 | 2/2003 | Deaton et al. | |
| 6,547,129 B2 | 4/2003 | Nichols et al. | |
| 6,578,760 B1 | 6/2003 | Otto | |
| 6,592,029 B2 | 7/2003 | Brikho | |
| 6,609,104 B1 | 8/2003 | Deaton et al. | |
| 6,611,811 B1 | 8/2003 | Deaton et al. | |
| 6,647,372 B1 | 11/2003 | Brady et al. | |
| 6,659,341 B1 | 12/2003 | Wang | |
| 6,669,086 B2 | 12/2003 | Abdi et al. | |
| 6,684,195 B1 | 1/2004 | Deaton et al. | |
| 6,694,300 B1 | 2/2004 | Walker et al. | |
| 6,695,204 B1 | 2/2004 | Stinson et al. | |
| 6,728,397 B2 | 4/2004 | McNeal | |
| 6,754,640 B2 | 6/2004 | Bozeman | |
| 6,758,394 B2 | 7/2004 | Maskatiya et al. | |
| 6,786,398 B1 | 9/2004 | Stinson et al. | |
| 6,808,109 B2 | 10/2004 | Page | |
| 6,810,385 B1 | 10/2004 | Brady et al. | |
| 6,856,965 B1 | 2/2005 | Stinson et al. | |
| 6,882,641 B1 | 4/2005 | Gallick et al. | |
| 6,886,743 B2 | 5/2005 | Brikho | |
| 6,934,277 B1 | 8/2005 | Werve et al. | |
| 6,957,770 B1 | 10/2005 | Robinson | |
| 2002/0062249 A1 | 5/2002 | Iannacci | |
| 2002/0077890 A1 | 6/2002 | LaPointe et al. | |
| 2002/0112177 A1 | 8/2002 | Voltmer et al. | |
| 2002/0113122 A1 | 8/2002 | Brikho | |
| 2002/0174009 A1 | 11/2002 | Myers et al. | |
| 2003/0009382 A1 | 1/2003 | D'Arbeloff et al. | |
| 2003/0015583 A1 | 1/2003 | Abdi et al. | |
| 2003/0023555 A1 | 1/2003 | Rees | |
| 2003/0037012 A1 | 2/2003 | Mersky et al. | |
| 2003/0065595 A1 | 4/2003 | Anglum | |
| 2003/0089768 A1 | 5/2003 | Page | |
| 2003/0120562 A1 | 6/2003 | Clark et al. | |
| 2003/0179290 A1 | 9/2003 | Frazzitta et al. | |
| 2003/0195800 A1 | 10/2003 | Peters | |
| 2003/0236704 A1 | 12/2003 | Antonucci | |
| 2004/0026500 A1 | 2/2004 | Brikho | |
| 2004/0054587 A1 | 3/2004 | Dev et al. | |
| 2004/0088295 A1 | 5/2004 | Glazer et al. | |
| 2004/0189472 A1 | 9/2004 | Acosta et al. | |
| 2004/0193522 A1 | 9/2004 | Binet et al. | |
| 2004/0234117 A1 | 11/2004 | Tibor | |
| 2004/0243665 A1 | 12/2004 | Markki et al. | |
| 2004/0258281 A1 | 12/2004 | DelGrosso et al. | |
| 2005/0035193 A1 | 2/2005 | Gustin et al. | |
| 2005/0068901 A1 | 3/2005 | Nurminen et al. | |
| 2005/0125295 A1 | 6/2005 | Tidwell et al. | |
| 2005/0125296 A1 | 6/2005 | Tidwell et al. | |
| 2005/0125337 A1 | 6/2005 | Tidwell et al. | |
| 2005/0125338 A1 | 6/2005 | Tidwell et al. | |
| 2005/0125339 A1 | 6/2005 | Tidwell et al. | |
| 2005/0125350 A1 | 6/2005 | Tidwell et al. | |
| 2005/0125351 A1 | 6/2005 | Tidwell et al. | |
| 2005/0125360 A1 | 6/2005 | Tidwell et al. | |
| 2005/0133587 A1 | 6/2005 | Michelassi et al. | |
| 2005/0137982 A1 | 6/2005 | Michelassi et al. | |

FOREIGN PATENT DOCUMENTS

| | | |
|---|---|---|
| WO | WO 01/99072 A2 | 12/2001 |
| WO | WO 03/029928 A2 | 4/2003 |

OTHER PUBLICATIONS

Lawrence Aragon. Show me some ID. PC Week Online (http://www.zdnet.com/pcweek/0112/12bio.html) Jan. 1998.

Gerald Lazar. Agencies Scan Biometrics for Potential Applications. FCW.com (http://www.fcw.com.pubs.few.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http:/www.srapi.com/svapipr.html. Oct. 1996.

New Technology Enables Computers to Identify. Verify User Voices. http://www.srapi.com/savpi/pr041597.html. Apr. 1997.

Accounting 5544. Biometric Technology. http://acctserver.cob.vt.edu/faculty.jhicks/acct5544/present/ddeverea.htm. Apr. 1997.

Vault FAQs. http://www.ImagineNation.com/Xanadu/Vault. Jun. 1997.

John Daugman. The Scientific Basis for Iris Recognition. Http://www.iriscan.com/basis.htm. Dec. 1998.

Electronic Banking 1. http://www.sjb.co.uk/eb1.html. Aug. 1998.

Biometric Technology Today (Btt). vol. 6(5) Sep. 1998.

Biometric Digest. Mar. 1998.

Biometrics in Human Services. vol. 2(1) Feb. 1998.

Biometric Access Corporation Debuts Enhanced Secure Touch-n-Pay Solution at FMI Merketechnics 2002 Event, Press Release, Feb. 1, 2002.

Secure Touch-n-Pay RVS, 2003.

Biometric Access Company, Retail Industry Solutions, 2004.

BioPay Biometric Payment Services, Version 2.9 User's Manual, Mar. 1, 2001.

MophoTouch™—Multi-Application Finger Identification in the Palm of Your Hand, Sagem Morpho, Inc., 1999.

"The Biometric Bar Tab Project." http://www.csee.wvu.edu/~wise/biometric/index.htm, including Dec. 9, 2002 Proposal and May 5, 2003 Team Report.

Secure Check Cashing Systems. Network Services. http://www.securecheckcashing.com/dev/network.html.

Secure Check: System Features. http://securecheckcashing.com/quadflyer.pdf. Apr. 22, 2005.

Softwise: Business Automation Solutions. http://www.softwiseonline.com. Apr. 22, 2005.

* cited by examiner

Assistance Procedures

Please select all that apply:

- ☑ Negotiable instrument stock too thin, textured or slick.
- ☐ Edges of the negotiable instrument cut or smooth (i.e., without perforation).
- ☐ No watermark present on the negotiable instrument.
- ☐ Broken characters or numbers.
- ☐ Print appears to be squeezed together.
- ☐ Corrections, changes, or strikethroughs present on the negotiable instrument.
- ☐ The written amount does not match the number amount.
- ☐ More than one color of ink or pen type.
- ☑ Ink appears to be smudged.
- ☐ Printed text feels slightly raised.

Proceed   Cancel

*Note: You are responsible for any responses you do or do not check. Please review all the above selections carefully.*

FIG 3

SYSTEM AND METHOD FOR NEGOTIABLE INSTRUMENT CASHING TRANSACTION ASSISTANCE PROCEDURES

FIELD OF THE INVENTION

This application is a continuation-in-part of application Ser. No. 10/142,687, filed May 10, 2002, now U.S. Pat. No. 6,957,770. The above-identified application is incorporated by reference herein, in its entirety, for all purposes.

BACKGROUND OF THE INVENTION

Generally, the success of a negotiable instrument (NI)-cashing operation is dependent upon the individual conducting the cashing transaction, such as an NI-cashing merchant or merchant employee, herein referred to as a "casher." Typically, an NI is a paycheck, personal check, government instrument, money order, or other form of payment voucher. Cashers often lack sufficient training or motivation to perform their jobs properly and criminals target NI-cashing locations that employ such cashers. If a casher is uncertain whether to cash an NI, he may ask another casher, such as a supervisor, for assistance. However, this method is ineffective if no one is present to provide aid or if the other person is equally unknowledgeable. Cashers can utilize NI-cashing systems to attempt to prevent fraud, but such systems do not sufficiently involve cashers in the cashing process. Typical NI-cashing systems advise cashers regarding the validity of an NI based upon prior data related to its maker and/or the presenter, but do not require the casher to participate in the validity determination process. Cashers can accept NIs deemed acceptable by such systems without considering other factors. Likewise, irresponsible or dishonest cashers can purposely ignore the recommendations of NI-cashing systems and accept fraudulent NIs. The acceptance of fraudulent NIs is obviously a problem for NI-cashing merchants, but is also troublesome for the providers of NI-cashing systems. Often, a system provider guarantees the NIs cashed via the use of its system and reimburses merchants when an accepted NI is fraudulent. However, system providers can wrongly compensate merchants for fraudulent NIs that are accepted because a casher used the system improperly or did not perform validity tests that the system cannot perform itself. What is needed is an improved system and method for cashing NIs that assists a casher by necessitating that he participate in the determination of an NI's validity.

SUMMARY OF THE INVENTION

The present invention addresses the aforementioned needs by providing a system and method of assistance procedures that involve a casher in the NI-validity determination process. The present invention involves the casher in the determining process by providing walkthrough and network assistance procedures.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3 illustrates an example of a walkthrough assistance procedure in a negotiable instrument cashing assistance system.

DETAILED DESCRIPTION OF THE INVENTION

Figure 1:
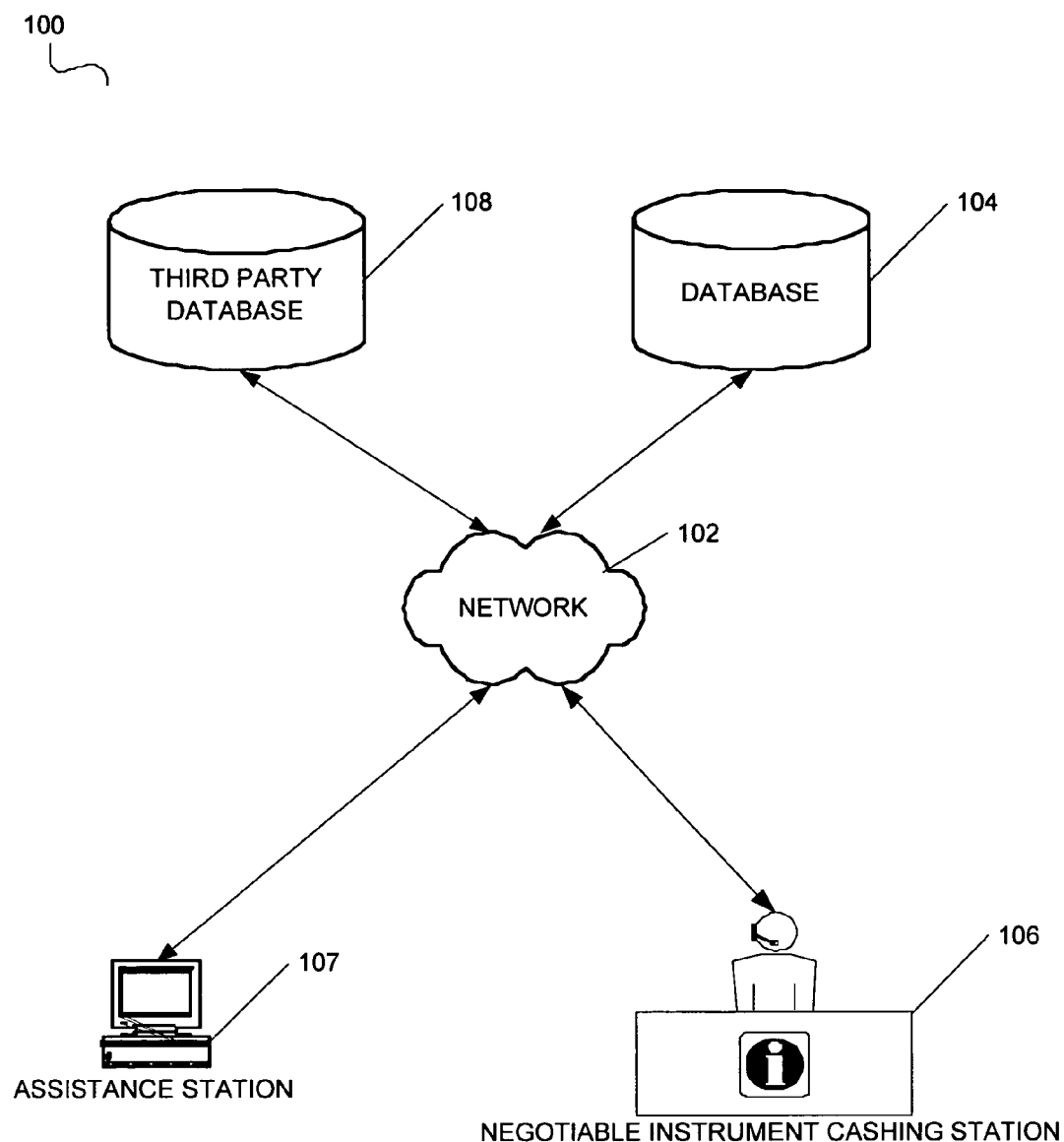
FIG. 1 illustrates a general architecture overview of a negotiable instrument cashing assistance system.

Various embodiments of the invention are discussed in detail below. While specific implementations are discussed, it should be understood that this is done for illustration purposes only. A person skilled in the relevant art will recognize that other components and configurations can be used without parting from the spirit and scope of the invention.

As aforementioned, cashers accept fraudulent NIs for a variety of reasons. A new casher, or a poorly trained one, could accept a fraudulent NI because he lacks the knowledge to determine whether an NI is legitimate. Likewise, a casher could decline to cash a valid NI due to his naïve. Moreover, a negligent casher could inappropriately accept or a decline an NI due to inattention or indifference.

Cashers can attempt to verify the validity of an NI presented for cashing by seeking assistance from another individual, such as a supervisor or more experienced casher. However, such individuals are not always available to provide assistance. Although a casher is likely to undergo a training period during which requests for help are expected, NI-cashing merchants ultimately expect each employee to be responsible for his transactions. Cashers could be hesitant to ask for help when they feel that they should know the appropriate action to take (even when they do not) or could attempt to determine an NI's validity improperly and, therefore, inaccurately. Furthermore, even an experienced casher could not know how to handle a cashing transaction if the NI is unusual. For example, a casher could be knowledgeable regarding payroll NIs but have little experience with government-issued NIs.

A resourceful casher could call the financial institution listed on the NI to ensure the account has sufficient funds. However, this can be a time-consuming process, requiring the casher locate the financial institution's phone number and reach an individual at the institution willing and able to help. Additionally, this type of research is limited by the financial institution's business hours. For example, if the financial institution closes at 5:00 PM, this method will be of no use if the NI is presented at 5:30 PM. Moreover, this method is not effective if the account is a large company account because while the account could have sufficient funds, the financial institution cannot determine what NIs the company has issued. For example, the presented NI could be a Wal-Mart paycheck, and the Wal-Mart account would obviously have enough funds. However, the Wal-Mart paycheck could be a fraudulent NI that has an accurate account identifier.

Some conventional NI-cashing systems attempt to reduce fraud by providing the casher with an acceptance recommendation based upon an evaluation of stored NI-cashing data associated with the presenter and/or the maker. A presenter is an individual presenting the NI to the casher for cashing and a maker is the holder of the account on which an NI is drawn (therefore, in some cases a presenter and maker are one in the same). While such systems are helpful, they do not involve cashers in the validation process. During a typical cashing transaction, a casher receives presenter identification, such as an identification token or biometric data, and runs the presented NI through an NI reader. The NI-cashing system then determines a recommendation regarding the NI's validity by evaluating associated records. In general, NI-cashing systems provide one of three recommendations, such as Accept, Decline, or Warning. Although an inattentive or dishonest casher can disregard a Decline recommendation and accept a fraudulent NI, problems can also arise when the NI-cashing system provides a Warning recommendation. Generally, a Warning recommendation occurs when information associated with the presenter and/or maker reflects an irregularity, but does not designate blatantly fraudulent behavior. Therefore, when presented with a Warning recommendation, the casher must establish the validity of the NI. An unknowledgeable casher can reject a valid NI or accept a fraudulent one. Furthermore, if the information in the NI-cashing system is not current, perhaps due to casher negligence, the NI-cashing system's recommendation could be inaccurate. For example, out-of-date NI-cashing system records may not reflect that a presenter has cashed a fraudulent NI since the last system update, and therefore mistakenly recommend the acceptance of another fraudulent NI from the presenter.

In addition to the obvious problems that such errors cause merchants, the providers of NI-cashing systems suffer as well. NI-cashing system providers often offer their clients, i.e., NI-cashing merchants, guaranteed service on NIs cashed with the use of their product. As mentioned, although such NI-cashing systems are useful in reducing NI fraud, they do not alleviate problems caused by the casher. However, regardless of the reason, the NI-cashing system provider could be responsible for reimbursing the merchant for an accepted fraudulent NI. Furthermore, an unscrupulous merchant could knowingly process fraudulent NIs in order to defraud an NI-cashing system provider.

The present invention overcomes the aforementioned problems by providing an NI-cashing assistance system (NICAS) that integrates procedures that ensure a casher thoroughly and accurately analyzes data associated with an NI presented for cashing. In one embodiment, the system instructs the casher to obtain further data pertaining to the presenter, the maker, and/or the NI itself. In another embodiment, the NICAS issues an assistance request to a system network of authorized individuals, such as other cashers or NICAS representatives, who can provide aid. In either embodiment, assistance procedures can serve to validate that the casher has taken the necessary steps to determine the validity of the NI presented for cashing.

The NICAS can function at every cashing transaction or can be initiated by certain cashing transaction parameters. For example, NICAS procedures could be dependent upon the time of day or day of the week of the transaction, maker information, the NI amount, presenter information, presenter identification type, the experience of the casher, and the like. Alternatively, the casher can activate the NICAS upon his own volition.

The NICAS can assist cashers by guiding them through a determination process, thereby lessening the reliance on casher judgment. For example, the NICAS can present a stepped process by which the casher is presented with a series of questions that are answered before the cashing transaction proceeds. By requiring the casher to evaluate NI-cashing data per these questions, the NICAS can prevent the acceptance of fraudulent NIs by inattentive, unskilled, and/or unscrupulous cashers. Moreover, by participating in this walkthrough procedure, a casher can validate that he took the necessary actions to prevent the acceptance of a fraudulent NI.

In another embodiment, the NICAS can issue an assistance request to a network of knowledgeable individuals, herein referred to as "advisors," that can provide support with a cashing transaction. Such advisors can be other cashers, NICAS representatives, or the like. For example, if the NICAS deems an assistance request is warranted, such as when a Warning recommendation is generated, the NICAS can issue a request to advisors via the system network. Advisors can provide guidance regarding the legitimacy of the presented NI via real-time communication with the casher, such as through an instant messaging function, via video conference, via a telephone connection, or the like.

Although the NICAS can function automatically, a casher can alternatively activate assistance procedures as he deems necessary. For example, a casher could require assistance for a nonstandard NI and could activate the NICAS to undergo walkthrough procedures and/or transmit an assistance request via the system network.

FIG. 1 illustrates a general architecture overview of NICAS 100. As will be described in detail below, NICAS 100 enables flexible methods for involving a casher in the validity determination process during a cashing transaction. NI-cashing data, such as presenter data, maker data, or the like, is stored in database 104. Database 104 can represent one or more databases utilized within the system. In one embodiment, database 104 is a central database to which all NI-cashing data is stored and from which NI-cashing data is accessed for NI validity determination. In another embodiment, database 104 also includes one or more casher databases to which a select set of NI-cashing data is stored and from which a select set of NI-cashing data is accessed for NI validity determination. In an additional embodiment, NICAS 100 can also utilize a combination of central databases and one or more casher databases. In general, embodiments utilizing a combination of databases enable increased control of information flow throughout NICAS 100. In still further embodiments, database 104 can comprise one or more sub-databases that are contained within a particular database. In such embodiments, NI-cashing data can be distributed across multiple databases within database 104.

Entities directly associated with NICAS 100, such as system providers and system provider employees, herein known as "NICAS representatives," can access NICAS 100 functions and/or records. A NICAS representative can be an employee of NICAS 100 capable of monitoring and assisting with the operation of NICAS 100 functions. For example, a NICAS representative can access NI-cashing data in order to verify presenter and casher registration data or administer NICAS 100 maintenance procedures.

Database 104 is connected to network 102, which can be, but is not limited to, the Internet. Networks used in additional embodiments include local area networks (LANs), wide area networks (WANs), and telephone networks. Network 102 includes connections to at least one NI-cashing station 106 where NI-cashing data is received. NI-cashing station 106 includes the necessary means for receiving and transmitting NI-cashing data to and from database 104 or other system stations. For example, NI-cashing station 106 can include an NI reader, identification token scanner, computer system (e.g., central processing unit, mouse, keyboard, and monitor), biometric input device (BID), camera, microphone, telephone, or the like. Typically, NI-cashing station 106 is operated by a casher and serves as the transaction point during a cashing transaction. In one embodiment, NI-cashing station 106 is also a point of sale and can process other transactions, such as purchases and returns.

Additionally, network 102 can include connections to at least one assistance station 107. Assistance station 107 is a location at which an advisor can respond to an assistance request issued via network 102. As such, assistance station 107 can include the necessary means for providing assistance, such as computer system, telephone, camera, microphone, or the like. In one scenario, NI-cashing station 106 and assistance station 107 are one in the same. For example, an advisor can respond to assistance requests from assistance station 107, as well as conduct cashing transactions. In another scenario, the sole function of assistance station 107 is to provide a means for responding to assistance requests. For example, a casher conducting a cashing transaction at NI-cashing station 106 can issue an assistance request, and an advisor can respond via assistance station 107.

Additional embodiments of NICAS 100 also include connections to one or more third party sources, such as third party database 108, in which NI-cashing data can be verified and/or from which NI-cashing data can be retrieved. In one embodiment, third party database 108 is a financial institution database and can provide NICAS 100 with access to financial accounts and associated information. For example, NI-cashing data can indicate an account held at third party database 108 in which the amount of a cashed NI is to be deposited. As another illustration, the system could retrieve a presenter's credit history from third party database 108 to assist with the determination process.

Information transferred in the system can be encrypted. For example, information can be encrypted at one point and sent across a non-secure connection between points or not encrypted at a point of communication and sent to the other point of communication across a secure connection. Encryption and decryption of these messages can be monitored by services provided by a security company such as VeriSign. In one scenario, as an added level of security, information internal to a system station and which is never transmitted can also be encrypted. This prevents retrieval of sensitive information from stolen equipment. In an additional embodiment, the system incorporates one or more anti-tampering methods by which to recognize authentic and non-authentic system requests.

Figure 2:
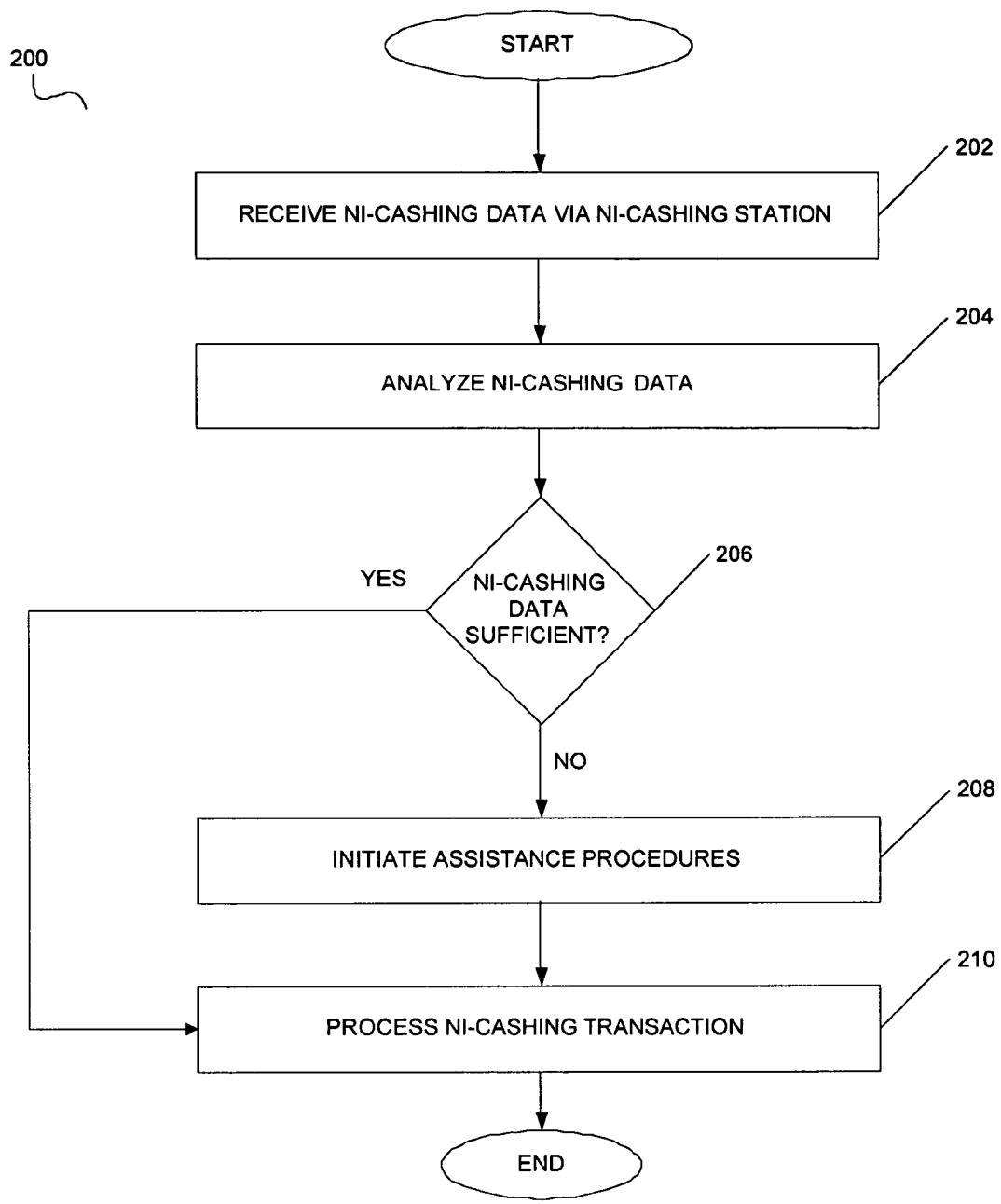
FIG. 2 illustrates a flowchart of a process for involving a casher in a negotiable instrument validity determination process.

FIG. 2 illustrates a flowchart of a process for involving a casher in an NI validity determination process. At step 202, an NI-cashing system receives NI-cashing data via NI-cashing station 106. In one scenario, NICAS 100 is a full-service system and the NI-cashing system is one element of NICAS 100. For example, a service provider can offer a product that incorporates both a traditional NI-cashing system as well as NICAS 100 procedures. In another scenario, NICAS 100 is a supplementary service functioning in conjunction with a separate NI-cashing system. The separate NI-cashing system can be affiliated with the NICAS provider or can be administered by an unrelated entity. For example, a system provider can offer multiple NI-cashing services, such as a traditional NI-cashing system as well as NICAS 100. Alternatively, a system provider could only offer a traditional NI-cashing system, and a casher could opt to utilize NICAS 100, offered by another provider. Typically, NI-cashing merchants pay a fee for access to NICAS 100, either on a per-use basis or via reoccurring billing (e.g., monthly, yearly, etc.).

NI-cashing data can include a variety of information associated with the cashing transaction. For example, NI-cashing data can pertain to the time of the current cashing transaction, such as the time of day or day of the week. NI-cashing data can also pertain to the presenter, such as the presenter's name, address, phone number, whether the presenter is new to the system or not, and the like. Furthermore, NI-cashing data can include presenter identification information, such as the type of identification token presented (e.g., driver's license, passport, military identification, etc.), whether the presenter has presented this identification before, or if the identification is unusual. Presenter identification data could be biometric data, which can include a fingerprint scan, an iris scan, a facial scan, a voice scan, a retinal scan, hand architecture, a DNA sample, and/or any other physical measurement pertaining to a presenter's person. Biometric data can be received from a variety of sources, such as from the presenter directly or from a third party source, such as a database, token, or the like. NI-cashing data can also include information relating to the maker of the NI, such as the maker name, maker address, or account information (e.g., MICR information, such as the account and routing number). In addition, NI-cashing data can pertain to the particular NI presented for the current transaction, such as the NI amount, the NI number, an image of the NI, physical features of the NI, or the like.

NI-cashing data can be received in a variety of means. Typically, the NI is placed through an NI reader, such as a MagTek check reader, which scans an image of the NI and gathers MICR information. Additionally, presenter identification is received through various devices. For example, a ScanShell identification token reader or a Sagem BID can be used to obtain presenter identification information.

In addition to receiving NI-cashing data at the time of the cashing transaction, stored NI-cashing data can be retrieved from database 104. If the presenter has processed a transaction with the casher in the past, he could be enrolled in the NI-cashing system and some or all of his information could already be in the system. Conversely, if the presenter is new to the system, he could undergo enrollment for subsequent use. If an NI from the maker has been processed by the system before, the system could have a record of transactions associated with this maker.

At step 204, the NI-cashing system analyzes NI-cashing data to determine whether the NI is valid. The particular location of this analysis could be dependent upon the system configuration. In one scenario, NI-cashing data is gathered from NI-cashing station 106 and transmitted to database 104 for analysis, incorporating any NI-cashing data stored in database 104. Alternatively, the analysis could transpire at NI-cashing station 106, with the system examining the data gathered there and perhaps retrieving associated NI-cashing data stored at database 104 during the analysis. For example, the system could compare the NI's maker information with stored maker information to check for inconsistencies, such as for an unusual dollar amount. Presenter information could be reviewed, such as examining the presenter's record to determine the number of valid and/or invalid NIs the presenter has processed before. Generally, the system analyzes the NI-cashing data to determine the likelihood of the current NI's validity.

At step 206, the NI-cashing system determines if the analyzed NI-cashing data is sufficient to generate a conclusive recommendation. For example, the NI-cashing system could recommend the NI be declined because the NI-cashing data indicates the presenter has a history of invalid NIs. Alternatively, if the NI-cashing data reflects that both the presenter and the maker are legitimate, the NI-cashing system could recommend the NI be accepted. If a conclusive recommendation is achieved, the cashing transaction is processed accordingly at step 210 (i.e., the casher accepts or declines the NI).

However, if the NI-cashing data is insufficient to yield a conclusive result (e.g., a Warning recommendation), NICAS 100 assistance procedures are initiated at step 208. Generally, an inconclusive result is generated when the system has insufficient information to make an accurate determination. For example, the NI-cashing system could lack a record of both the presenter and the maker and therefore lack a transaction history upon which to make a determination.

At step 210, the cashing transaction is processed according to the determination generated by assistance procedures. Typically, an NI will be processed by either being accepted or declined. In the unlikely event that NICAS 100 is unable to provide a conclusive validity determination after assistance procedures have been completed, the NI could be deemed suspicious and the system could recommend that the NI be declined. In one scenario, the system does not rank an inconclusive decline as severely as a conclusive decline, and therefore, does not list the maker and/or presenter as negative based upon such determination.

In one embodiment, NICAS 100 procedures automatically initiate per system parameters pertaining to the casher, the NI, the presenter, the maker, or any other aspect of the cashing transaction. For example, assistance procedures could initiate when an inconclusive result is generated by the NI-cashing system, the casher handling the transaction is registered as new or needing assistance, during a certain time of day, on a certain day, the maker is new, the maker's address or account information (e.g., MICR data) on the NI is different from the record, the amount of the NI is unusual for the maker and/or presenter, the NI amount is high, the presenter is new, the identification presented is new for an existing presenter, the presenter identification token is unusual, the NI is nonstandard, or the like. Alternatively, the casher could initiate assistance procedures per his own volition. In one embodiment, assistance procedures are implemented regardless of the NI-cashing system's analysis. For example, in order for a casher to receive guaranteed service, a system provider could require that assistance procedures be implemented with all cashing transactions.

In one embodiment, NICAS 100 can implement a walk-through procedure to assist the casher. The walkthrough procedure can necessitate the casher thoroughly examine further NI-cashing data and enter it into the system. For example, NICAS 100 can present a screen in which the casher can place a mark in a checkbox or provides a yes or no answer in response to a series of questions. In one scenario, the questions presented to the casher regard information that the NI-cashing system cannot acquire automatically and, therefore, require casher input. For example, NICAS 100 could display a question such as "Are the edges of the negotiable instrument cut or smooth (i.e., without perforation)?" An NI without perforation indicates that the NI may have been fraudulently made, but a typical NI-cashing system cannot determine such features. Other possible questions can include:

Is the NI stock too thin, textured or slick?
Are the edges of the NI cut or smooth (i.e., without perforation)?
Is there a watermark present on the NI?
Are there broken characters or numbers on the NI?
Does the print appear to be squeezed together?
Are there corrections, changes, or strikethroughs present on the NI?
Does the written amount match the number amount?
Is there more than one color of ink or pen type?
Does the ink appear to be smudged?
Does the printed text feel slightly raised?

NICAS 100 could provide a variety of questions in order to obtain a sense of the presenter's legitimacy by searching for inconsistencies in the presenter's responses and stored presenter's data. For example, if the NI is a paycheck and the maker is different from those the presenter has previously cashed, NICAS 100 could prompt the casher to ask if the presenter has changed jobs. Likewise, if the amount of the NI is inconsistent with previous cashing transactions, NICAS 100 could prompt the casher to ask why. Other questions could relate to the geography associated with the presenter, such as his address and locations or streets in the vicinity of his address.

NICAS 100 could also search for maker inconsistencies. For example, NICAS 100 could contain a variety of questions specific to makers, such as those for common employers. For example, if the NI is a Home Depot paycheck, NICAS 100 could prompt the casher to ask a variety of questions that a Home Depot employee should be able to answer, such as seemingly innocuous questions about the store. For example, if Home Depot does not sell oil-based paint, the system could prompt the casher to ask the presenter if Home Depot has any deals on oil-based paint. If the presenter answers "yes," it could be a sign that he does not actually work at Home Depot and the NI is therefore invalid. If the NI is a paycheck, other questions could be about employees (e.g., the presenter's supervisor or co-workers), the type of work associated with the NI, geography associated with maker (e.g., the employer's address, locations or streets near the employer location, etc.) or the like.

NICAS 100 could also prompt the casher for data concerning the presenter's identification token. Conventional NI-systems typically do not provide methods for token verification, thereby requiring a casher to do so manually, such as by consulting a book containing identification token information. Identification token verification can be of particular importance if the cashing transaction is an enrollment transaction because the token information could be stored in the system for subsequent transactions. As aforementioned, identification token information can be obtained by hand-keying or from a token reader. NICAS 100 could prompt the casher to provide further information regarding the token in order to determine its legitimacy. For example, NICAS 100 could prompt the casher to examine the token for a particular holographic watermark or inquire about the token's layout to ensure that it is accurate for the token type. The casher can then input such further information, for example, by marking a checkbox or providing a "yes" or "no" answer. If the token is determined to be fraudulent or suspicious, NICAS 100 could decline the NI.

In one embodiment, NICAS 100 can present a pictorial or video guide to assist the casher in examining the identification token and/or presented NI. For example, NICAS 100 could display a video clip illustrating how to locate an NI watermark or an animation demonstrating how to determine if an identification token is legitimate. For instance, NICAS 100 could demonstrate how a holographic watermark should turn from blue to red when held to a light and tilted.

NICAS 100 can assist a casher in using his own judgment regarding the NI's validity. The casher can obtain a sense of the NI's validity as he gathers further NI-cashing data. In one embodiment, the casher has the authority to override the system's determination if he believes the NI could be fraudulent. For example, even though a presenter provides a correct answer to an assistance procedure question, the casher could believe the presenter is lying (e.g., due to the presenter's body language) and decline the NI.

In addition to requesting further NI-cashing data, NICAS 100 could prompt the casher to take other steps to ensure an accurate determination. If NICAS 100 detects that the NI-cashing system does not contain up-to-date records, the casher could be prompted to update the system. For example, the casher could synchronize NI-cashing station 106 with records held at database 104 or on data held on an update CD-ROM. The NI-cashing system could then reexamine the received NI-cashing data with the updated information.

FIG. 3 is user interface 300, which illustrates an example of a walkthrough procedure in which NICAS 100 presents a list of options to the casher, thereby acquiring more NI-cashing data. Such options could be presented to the casher at once, as shown in FIG. 3, or over a series of screens. In one embodiment, NICAS 100 could present one option at a time, making a determination after each casher response regarding whether the NI is valid. NICAS 100 could continue to present options to the casher until a successful determination can be made. In the event that a successful determination cannot be made after all questions have been presented, NICAS 100 could suggest the casher decline the NI because conclusive validity could not be determined. Alternatively, NICAS 100 could initiate further assistance procedures, such as issuing an assistance request to network 102.

In addition to, or instead of, initiating a walkthrough procedure, at step 208, NICAS 100 can issue an assistance request via network 102. An assistance request is generated based upon NI-cashing data analyzed at step 204 and/or any NI-cashing data that has been subsequently received (such as during a walkthrough procedure). NICAS 100 transmits the assistance request to one or more assistance stations 107 connected to network 102. As mentioned above, assistance station 107 can be a remote embodiment of an NI-cashing station 106 or can be exclusively employed for responding to assistance requests. Depending upon the embodiment, an advisor operating assistance station 107 can be another casher, such as a clerk, supervisor, or merchant, or a NICAS representative.

An assistance request can contain a description of the cashing transaction, associated NI-cashing data, or a combination thereof. If NI-cashing data is not provided or not completely provided with the request, the advisor can retrieve further information by accessing database 104 and/or NI-cashing station 106, as would be determined by the manner in which the NI-cashing data is shared.

In one embodiment, one or more network dispatchers oversee network 102 operations and the distribution of assistance requests throughout the network. A network dispatcher evaluates assistance requests and selects one or more appropriate advisors. Depending upon the embodiment, a network dispatcher can be an actual person, such as a NICAS representative or casher, or an automated entity. In addition to matching assistance requests with advisors, a network dispatcher can ensure that a sufficient number of advisors are available per the demand. For example, a casher could be required to provide assistance or set himself as available for assistance requests if a network dispatcher determines there is a demand for advisors. Likewise, a network dispatcher can limit the number of advisors, for example, to lessen the demands on the NICAS server.

Before transmitting an assistance request to network 102, NICAS 100 can first examine system records to determine if a similar assistance request has already been answered. If so, NICAS 100 can present information from the previous response to the requesting casher. In one scenario, keywords within an assistance request initiate this prescreening process. If NICAS 100 determines that the NI-cashing system does not contain up-to-date records, it could prompt the casher to update the NI-cashing system, or do so automatically, before proceeding with the assistance request. If a casher has sufficient authority, he can override the prescreening process in order to transmit his assistance request to network 102 directly. Alternatively, the casher can activate the prescreening process himself.

In one scenario, a chain of NI-cashing locations could be configured to permit cashers to assist other affiliated cashers via network 102. For example, a grocery store chain such as Giant could utilize NICAS 100 to allow cashers to issue assistance requests to any other Giant locations networked with NICAS 100. In another scenario, an assistance request could be issued to any advisor connected to network 102, regardless of affiliation. In order to prevent dishonest advisors from abusing this configuration (i.e., purposely providing bad advice), NICAS 100 can identify each advisor in the system and maintain a record both of a casher's cashing transactions and assistance responses. For example, an advisor could be biometrically identified when logging onto the system and/or when responding to an assistance request. Alternatively, an advisor could be identified by an employee identification number or other identifier.

Figure 4:
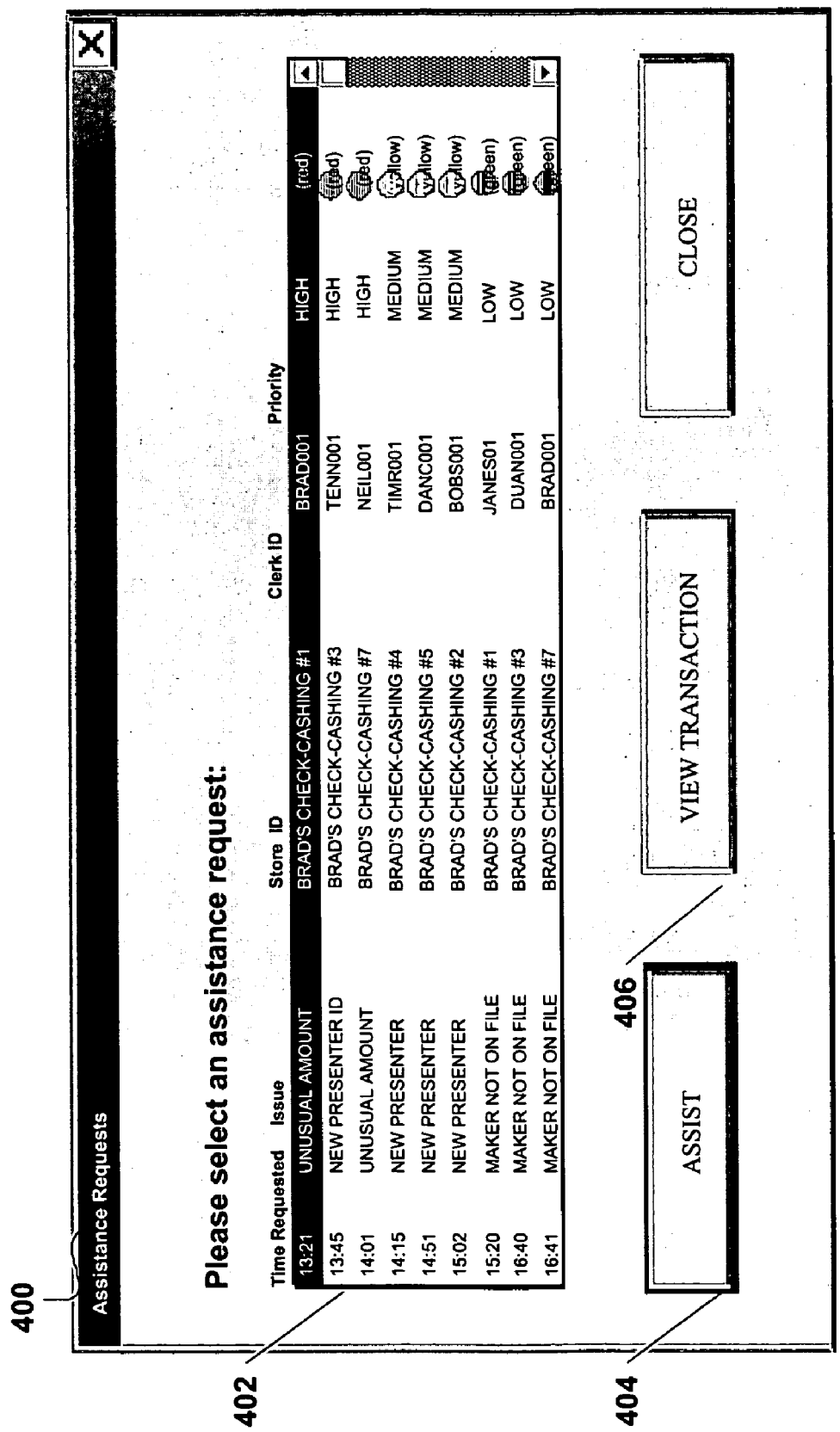
FIG. 4 illustrates an example of a queue of assistance requests issued via a negotiable instrument cashing assistance system.

In one embodiment, NICAS 100 displays a queue of pending assistance requests, an example of which is illustrated by user interface 400 in FIG. 4, to all available advisors or to one or more select advisors. Line 402 illustrates an example of information that could be displayed to an advisor viewing the queue, such as the time the request was placed, the reason for the request, the location from which the request was issued, the casher issuing the request, and the request's priority. To initiate an assistance response, an advisor could select a request and click Assist button 404. Alternatively, an advisor could click View Transaction button 406 to view more information regarding the relevant transaction before deciding to assist.

If the queue is displayed to a group of advisors, the system can gradually increase the number of advisors until one responds. To increase efficiency, NICAS 100 can record queue data in order to employ it when determining how many advisors to query. For example, if an assistance request was not answered until 20 advisors were queried, the system could automatically query 20 advisors when it receives a similar, subsequent request.

A casher, network dispatcher, and/or NICAS 100 can designate the urgency of the assistance request and the degree of help desired. For example, if a casher simply wants a second opinion before approving an NI for cashing, his assistance request could be listed as less urgent than one from a casher requiring full assistance with a difficult cashing transaction. The most urgent request could display as the front screen at assistance station 107. Alternatively, as shown in FIG. 4, assistance requests could be color-coded by priority (e.g., red for the most urgent, green for less urgent, etc.) in the assistance request queue.

In one scenario, a casher can purchase a higher degree of priority. For example, NI-cashing merchants that subscribe to a premium service package can have their assistance requests answered faster than those with standard service or a higher degree of priority could be bought on a per transaction basis. Alternatively, assistance requests are prioritized by the order in which they were issued. The casher or network dispatcher can place a time limit on a request and the system could display a timer for each request and the most urgent could be presented accordingly. If the requesting casher does not receive a response, or a satisfactory response, within the time limit, the casher or NICAS 100 can decide what action to take. For example, the NI could be declined if no advisors respond.

Which individuals are authorized to respond to assistance requests can vary by system implementation. In one embodiment, assistance requests are solely transmitted to NICAS representatives. These NICAS representatives could only respond to assistance requests or could have other system-associated duties as well. In another embodiment, assistance requests are transmitted to other available cashers that are authorized to respond.

In one embodiment, advisors can determine their assistance availability, thereby allowing the system to query only those willing or able to help. For example, a casher too busy to provide assistance can log off network 102 or list himself as unavailable. Additionally, an advisor can establish specific levels of availability. An advisor could only be available for cashing transactions in which he has experience. For example, an advisor inexperienced with government checks could set himself as unavailable for such assistance requests. In one scenario, NICAS 100 can disregard an advisor's availability preference, such as when a particularly pressing assistance request needs a response or if the advisor's record indicates he is not meeting an assistance response quota. Alternatively, NICAS 100 can determine an advisor's availability based upon an assistance station identifier. For example, an assistance station identifier could indicate a casher chain or the geographic location of assistance station 107 and, if the casher chain or region requires advisors, NICAS 100 could activate such advisors accordingly.

In order for cashers to serve as advisors in NICAS 100, they could be required to meet eligibility requirements. For example, only supervisors or experienced cashers could be allowed to provide assistance via NICAS 100. In one embodiment, advisors have a rating that reflects their NI-cashing capabilities, such as experience level, certification, management level, and the like. Alternatively, this rating can be determined by system parameters, such as the extent of the advisor's system use, the advisor's NI-cashing record (e.g., the number of cashing transactions conducted, the number of cashing transactions assisted, the amount of valid and invalid NIs accepted or advised for cashing, etc.), and the like. In addition, an advisor's rating could be determined, in part or solely, by feedback from cashers. For example, each time an advisor provides assistance, the requesting casher could rate the assistance. This data could be stored and analyzed to determine the advisor's rating. The more positive feedback an advisor receives, the higher his rating. Advisor ratings could be displayed as a percentage to other network users, with a higher percentage reflecting a higher-quality advisor. For example, an advisor with extensive system experience and an excellent NI-cashing history could have an advisor rating of 90%, whereas a new or incompetent advisor could have an advisor rating of 10%.

Figure 5:
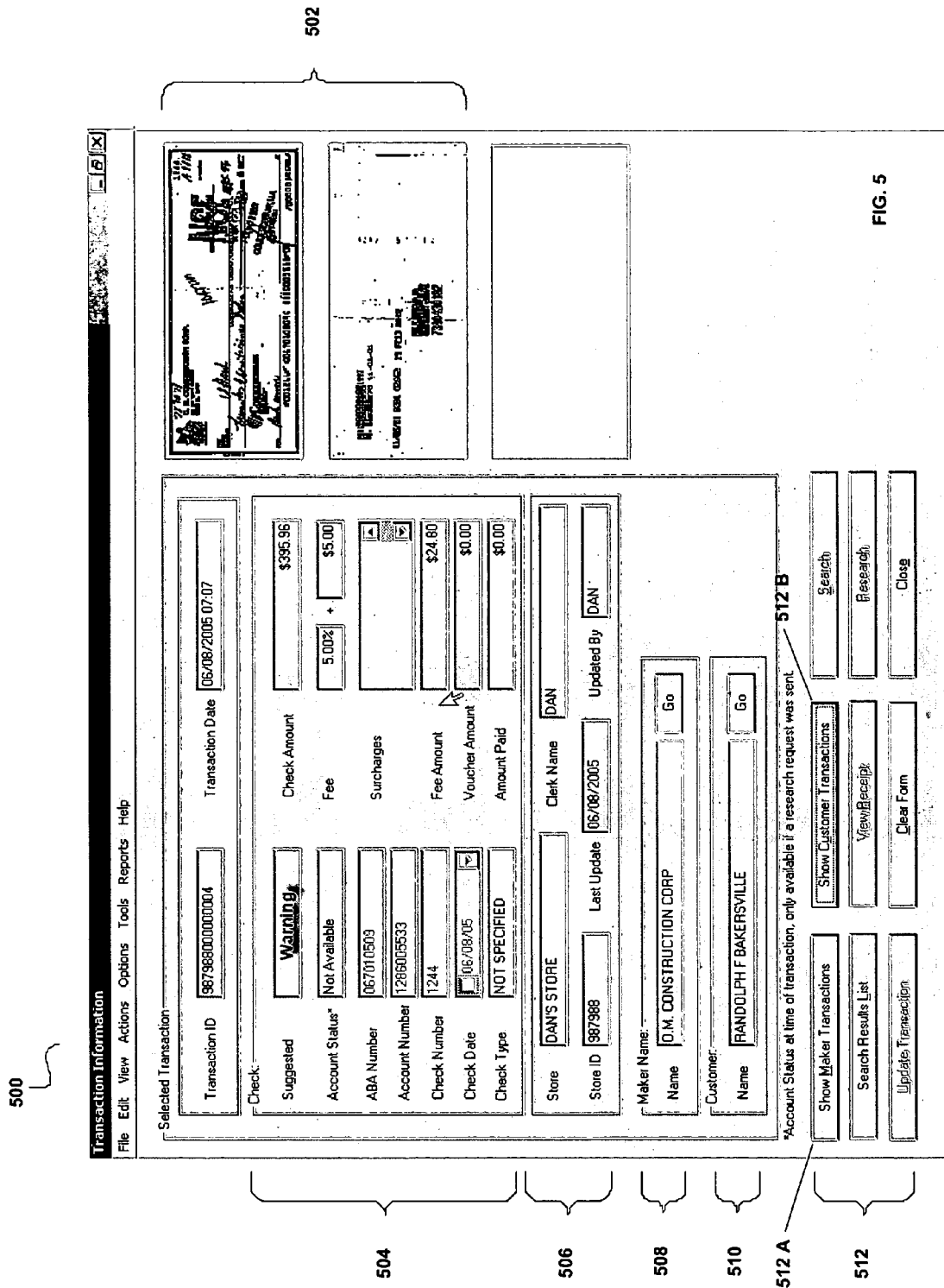
FIG. 5 illustrates an example of a transaction information screen presented to an advisor responding to an assistance request via a negotiable instrument cashing assistance system.

Depending upon the embodiment, an advisor can review the associated NI-cashing data before opting to respond to the assistance request. Alternatively, NI-cashing data could only be available once an advisor has chosen to provide assistance. For example, an advisor could click View Transaction button 406 shown in FIG. 4 to access an NI-cashing data interface screen, an example of which is illustrated by NI-cashing data interface screen 500 in FIG. 5. NI-cashing data can be sent to database 104 and then to assistance station 107 or NI-cashing data can be sent directly to assistance station 107. FIG. 5 indicates an example of how NI-cashing data could be displayed to an advisor. An advisor could review images of the NI at area 502, NI information (such as account status, ABA number, account number, NI number, NI date, NI amount, etc.) at area 504, maker information at area 508, presenter information at area 510, or the like. The manner in which NI-cashing data is displayed can vary by system implementation. In one embodiment, an advisor can access further information by selecting the relevant field or clicking an onscreen button. For example, area 512 illustrates a selection of onscreen buttons from which an advisor could choose. An advisor could review previous NIs accepted from the maker by clicking Show Maker Transactions button 512 A, or could examine the presenter's previous transactions by clicking Show Customer Transactions button 512 B.

To provide assistance, an advisor can review the NI-cashing data to determine if the NI presented for cashing is valid. As aforementioned, if the casher has undergone a walk-through procedure, any data gathered during the procedure could be reviewed. The advisor could receive all the necessary NI-cashing data upon viewing the assistance request or could retrieve associated NI-cashing data as needed. In addition, an advisor could retrieve outside information from third party database 108. For example, third party database 108 could house credit score records of presenters and the presenter's credit score could factor into the NI validity determination, or third party database 108 could be a financial account database and an advisor could check the status of the maker's account.

An advisor can provide his response to the requesting casher in a variety of methods, including real-time text communication (e.g., via an instant message or chat function), email, a phone connection, Voice over Internet Protocol (VoIP), video conferencing, fax, or the like. For example, NICAS 100 could initiate a video conference or teleconference between the advisor, the casher, and/or the presenter. If the presenter is involved in the conference, the relevant device(s) (e.g., microphone, camera, etc.) could be directed towards the presenter. The advisor could discuss the transaction with the casher and prompt him with questions to ask or the advisor could communicate with the presenter directly. The advisor could receive information verbally and/or the casher could enter information into NI-cashing station 106, which in turn could be transmitted to the advisor. Such conferences allow advisors to rely on intuition as well as the information obtained.

In one embodiment, NICAS 100 can utilize computerized methods to detect suspicious behavior in the presenter. NICAS 100 could use lie detection methods to determine if a presenter is responding to a casher or advisor truthfully, such as via pupil dilation, spectrographic voice recognition, polygraph, or the like. For example, NICAS 100 could examine the dilation of a presenter's pupils or other stress conditions when the presenter answers particular questions. In one embodiment, the presenter could be asked to participate in suspicious behavior detection methods or they could be passively implemented. Although various detection means could be used, those that are less intrusive would be preferred. For example, a camera attached to NI-cashing station 106 used to transmit video-feed or for recording purposes could also detect pupil dilation. If suspicious behavior is detected, NICAS 100 can utilize this data in a variety of ways. For example, NICAS 100 could decline any cashing transaction if suspicious behavior is detected, could utilize this behavior data as one factor in determining if an NI is valid, could transmit behavior data to an advisor for review, or the like.

Multiple advisors can respond to an assistance request issued over NICAS 100. If the responding advisors differ on the course of action to be taken, the response provided could be determined by a majority vote of the participating advisors. If a majority vote is not reached, the system could recommend that the NI be declined. One vote could carry more weight when determining a majority vote if it comes from a senior advisor, such as a NICAS representative, a manager, a higher-rated advisor, or the like. Alternatively, a senior advisor's vote could be more influential only in the event of a tie amongst participating advisors. In one scenario, approval or denial need not be based upon a majority decision. For example, NI-cashing approval could require unanimous approval by all participating cashers. In addition, the requesting casher and/or a senior advisor could override the voting result if deemed necessary. The system can maintain a record of an advisor's votes and can reflect such data in the advisor's rating. An advisor that consistently votes correctly could increase his rating (and vice versa). In addition to the advisor's vote, the system could contain a record of an advisor's reasoning for the vote. For example, the advisor could input a note explaining why he voted to accept or decline the NI.

Although the above description details walkthrough procedures before network assistance procedures, this should not be construed as limiting. The order in which assistance procedures are employed can be dependent upon implementation. Furthermore, the particulars of which assistance procedures are employed could be implementation dependent. For example, assistance procedures can include walkthrough procedures, network assistance procedures, or a combination thereof.

At any point during the cashing transaction, the casher can suspend the transaction while awaiting assistance procedures to process. For example, the casher can pause the transaction while NICAS 100 analyzes information provided during a walkthrough procedure or while advisors review an assistance request. If the casher is aware that such a delay will be a significant amount of time, he could ask the presenter to wait while assistance is obtained, perhaps suggesting the presenter browse the casher's store. In one embodiment, the casher can conduct other activities during this processing period. For example, the casher could initiate another cashing transaction or, if the NI-cashing station also serves as a point of sale, process other types of transactions. Once assistance procedures have been processed, the casher can retrieve the relevant cashing transaction and proceed accordingly. In one scenario, the system can alert the casher, such as via a popup message or sound, that the assistance procedure has completed.

A record of the assistance procedures utilized can be stored at database 104, NI-cashing station 106, and/or assistance station 107. Cashers and advisors can be associated with cashing transactions in a variety of ways, including via their biometric data, employee identification numbers, or the like. An assistance procedure record can be reviewed by cashers, NICAS representatives, or the like, in order to evaluate the performance of cashers and advisors. In one scenario, the assistance procedures a casher undergoes during a cashing transaction make him responsible for accepting the NI for cashing. For example, the responses provided by the casher during a walkthrough procedure can serve as a recorded acknowledgement of the steps he has taken. Therefore, if a casher accepts an invalid NI for cashing, a record of the cashing transaction can be reviewed to verify that the casher took the appropriate actions. Thus, the record could serve to exonerate a casher of wrongdoing or illustrate negligent behavior. For example, if the casher accurately utilized assistance procedures and the accepted NI was fraudulent, the casher can prove that he did all that was required. Conversely, if the assistance procedures the casher claims to have taken were obviously not (e.g., the casher states he issued an assistance request, but the system has no record of the request), the casher can be reprimanded for being lax in his responsibilities.

Advisors can be associated with the cashing transactions in which they assist to ensure accountability for network assistance procedures. For example, an inattentive advisor could provide poor advice and inadvertently recommend the cashing of a fraudulent NI. A NICAS representative or casher can access the transaction record to view the determination process and note who recommended to accept or decline an NI. The assistance procedure record can be reviewed to evaluate both positive and negative performance. For example, a casher accessing an advisor's record could notice that an advisor ignored all assistance requests from other stores in the casher's chain or that an advisor consistently provided accurate and helpful responses.

In an additional embodiment, NICAS assistance procedures can serve as a training tool. After a casher has employed NICAS for a particular period, it could cease to function or could become an optional feature. For example, after a casher has handled 100 successful cashing transactions, NICAS could deactivate or become optional. As another example, after a casher has cashed 100 NIs at a 90% success rate, NICAS could become optional. Other requirements, such as the difficulty of the transactions handled, could also be factored into such a determination. For instance, a casher that has handled a higher volume of difficult NIs could opt out of the training mode earlier than a casher who has mainly overseen less demanding transactions.

If use of assistance procedures is voluntary, the NICAS service provider and/or cashers could offer incentives to increase casher and advisor participation. For example, cashers that participate with assistance procedures could receive a bonus check, a gift card, a gift, or the like. A casher or advisor's participation could also be a factor when determining promotions or raises. In regards to network assistance procedures, advisors could receive a reward for providing assistance in a timely fashion. For example, if an assistance request has a time limit, an advisor could be rewarded for responding before the time limit has expired. The quality of the assistance provided could also be analyzed when determining incentive distribution. For example, an advisor that provided assistance frequently but did so inadequately could receive a lesser reward than an advisor that provided assistance less often but more adequately. Conversely, instead of, or in addition to, being rewarded for good service, cashers and advisors could be punished for not using assistance procedures or doing so improperly. For example, a casher who provides incorrect information during walkthrough procedures, does not set himself as available for network assistance, or consistently provides incorrect assistance responses could receive a reprimand from management.

In an additional embodiment, in a multi-store scenario, NICAS representatives or cashers can change NICAS parameters for a particular geographic region. This allows NICAS representative and/or cashers to increase NI-cashing restrictions at known problem sites while allowing other locations to function normally. For example, locations in a particular city or along a particular stretch of highway could have a history of accepting fraudulent NIs. A NICAS representative can change the NICAS parameters for this region, causing NICAS functionality to activate more often or with stricter requirements than is typical. For instance, if assistance procedures typically activate for NIs over $1000.00 in the area in question, that parameter could be changed to NIs over $500.00. Regional fraud monitoring could be utilized to overcome both criminal presenters as well as to correct poor or dishonest casher performance. For example, a NICAS representative could tighten NICAS parameters for a particular casher chain if the chain has been targeted by criminals and/or has unskilled cashers. Such functionality could be of particular importance if the NICAS service provider offers a guarantee for NI transactions. To avoid confusion, a NICAS representative could inform the casher that parameters will be or have been changed and explain why. For example, a NICAS representative could inform the casher that NICAS parameters will be strengthened for Fridays because invalid NIs are consistently being accepted at the casher's store on that day of the week. Alternatively, the casher could be notified of parameter changes in an automatic fashion, such as messages received via NICAS 100. For example, when a casher accesses NI-cashing station 106, a message could display stating that system parameters have changed. Depending upon the security risk, the message could explain which parameters have been changed and why. However, NICAS 100 need not notify cashers of a parameter change or the reason for the change if system activity indicates that a casher could be willingly responsible for accepting fraudulent NIs. That is, if the casher or NICAS representative wishes to determine if someone is purposely accepting invalid NIs, it could be advantageous not to inform that individual that parameters have been changed.

A system and method of assisting cashers conducting cashing transactions has been illustrated. It will be appreciated by those skilled in the art that the system and method of the present invention can be used to ensure casher-involvement in cashing transactions via an NI-cashing assistance system. It will thus be appreciated by those skilled in the art that other variations of the present invention will be possible without departing from the scope of the invention disclosed. For example, the assistance system and methods described herein could apply to a variety of scenarios in which an individual needs to determine the sincerity of a person attempting an authorization. Such scenarios could include opening a financial account, transferring money, entry into a country through customs, or the like. For example, the assistance system described above could be used at a customs checkpoint in order to assist customs agents interviewing potential visitors. The assistance system could ensure a customs agent takes certain actions by mandating he utilize certain procedures, such as a walkthrough procedure or by requesting help from a group of more knowledgeable customs agents. Likewise, a teller at a financial institution could utilize the assistance system to gain assistance in determining whether an individual should be allowed to establish an account.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. In addition, it is to be understood that the phraseology and terminology employed herein are for the purposes of description and should not be regarded as limiting.

What is claimed is:

1. A method for assisting a negotiable instrument cashing transaction, the method comprising:

receiving, via a negotiable instrument cashing system, information related to a negotiable instrument presented to a casher for cashing;

evaluating the negotiable instrument information using one or more system parameters, wherein said system parameters indicate the acceptability of said negotiable instrument, wherein said system parameters pertain to information other than negotiable instrument presenter information;

if the evaluation yields an inconclusive result, automatically displaying an assistance instruction to said casher in a user interface of said negotiable instrument cashing system, said user interface including a field that enables said casher to indicate a completion of said assistance instruction upon acquisition of additional information related to said negotiable instrument;

determining whether said assistance instruction has been satisfactorily completed; and concluding the negotiable instrument cashing transaction according to said determination.

2. A method for assisting a negotiable instrument cashing transaction, the method comprising:

receiving, via a negotiable instrument cashing system, information related to a negotiable instrument presented to a casher for cashing;

evaluating the negotiable instrument information using one or more system parameters, wherein said system parameters indicate the acceptability of said negotiable instrument, wherein said system parameters pertain to information other than negotiable instrument presenter information;

if the evaluation yields an inconclusive result, automatically initiating an assistance procedure in said negotiable instrument cashing system that instructs said casher to acquire additional information related to said negotiable instrument;

receiving, via said negotiable instrument cashing system, said additional information related to said negotiable instrument;

determining whether said additional negotiable instrument information conflicts with one or more system parameters; and concluding the negotiable instrument cashing transaction according to said determination.

3. The method of claim 2, wherein said negotiable instrument information comprises one or more of a negotiable instrument image, negotiable instrument maker data, negotiable instrument account information, and negotiable instrument amount.

4. The method of claim 2, wherein said system parameters are one or more of a time of day, a day of the week, negotiable instrument casher information, negotiable instrument maker information, and negotiable instrument amount.

5. The method of claim 2, wherein said concluding comprises one of accepting said negotiable instrument for cashing or declining said negotiable instrument for cashing.

6. The method of claim 2, further comprising transmitting negotiable instrument-related information to a network of individuals who can provide assistance with said negotiable instrument cashing transaction.

7. A method for providing assistance for a negotiable instrument cashing transaction from a remote location, the method comprising:

receiving, via a negotiable instrument cashing assistance system, information related to a negotiable instrument presented to a casher for cashing;

evaluating the negotiable instrument information using one or more system parameters, wherein the one or more system parameters pertain to information other than negotiable instrument presenter information;

transmitting said negotiable instrument information to a network, wherein said network includes at least one authorized individual;

receiving from said authorized individual instruction regarding the determination of said negotiable instrument's validity; and conveying said instruction to said casher via said network.

8. The method of claim 7, wherein said transmitted negotiable instrument information is assigned a priority status based upon the urgency of the request.

9. The method of claim 7, wherein said authorized individual is one of a casher and a representative of said negotiable instrument cashing assistance system.

10. The method of claim 7, wherein said authorized individual is selected by a network intermediary.

11. The method of claim 7, wherein said authorized individual receives an incentive to provide said instruction.

12. The method of claim 7, further comprising prompting said authorized individual to review said negotiable instrument information.

13. The method of claim 7, further comprising selecting said authorized individual based upon eligibility.

14. The method of claim 7, wherein said conveying is accomplished via one or more of real-time text communication, email, telephone, fax, voice over internet protocol, and video.

15. The method of claim 7, further comprising storing a record of said authorized individual instruction.

16. A method of providing assistance for a negotiable instrument cashing transaction via a network, the method comprising:

receiving identifying information from an individual at a system station;

authorizing said individual to access a negotiable instrument cashing system network per said identifying information;

determining said individual's eligibility to provide assistance to a user of said network, said determination being based on an analysis of a negotiable instrument cashing system rating associated with said individual;

displaying via said network said individual's availability to provide assistance to said user;

receiving a request from said user for said individual to provide negotiable instrument cashing transaction assistance, and enabling said individual to provide negotiable instrument cashing transaction assistance to said user via said network.

17. The method of claim 16, wherein said negotiable instrument cashing system rating is determined by one or more of said individual's negotiable instrument cashing experience, management level, certification, individual feedback, negotiable instrument cashing transaction history, negotiable instrument cashing transaction assistance history, and extent of system use.

18. A method for configuring a negotiable instrument cashing system, the method comprising:

receiving identifying information from an individual;

authorizing said individual to access one or more regional parameters per said identifying information, wherein a regional parameter enables customization of one or more conditions for negotiable instrument cashing at one or more negotiable instrument cashing stations corresponding to an identified region, wherein said one or more conditions for negotiable instrument cashing include a condition not pertaining to the identity of a presenter of a negotiable instrument;

configuring one or more of said regional parameters per said individual's input; and automatically updating one or more negotiable instrument cashing stations per said configured regional parameters.

19. The method of claim 18, wherein said regional parameters designate one or more of a geographic identifier and a casher identifier.

20. The method of claim 18, further comprising notifying a casher of said updating.

* * * * *